(No Model.) 3 Sheets—Sheet 1.

P. LITTLER, T. HASLAM & J. MOORCROFT.
COMBINED AIR HEATER AND STEAM BOILER.

No. 413,758. Patented Oct. 29, 1889.

Witnesses.
Walter P. Keene.
J. E. Middleton

Inventors.
Peter Littler,
Thomas Haslam,
John Moorcroft.
by Ellis Spear
Atty.

(No Model.) 3 Sheets—Sheet 2.

P. LITTLER, T. HASLAM & J. MOORCROFT.
COMBINED AIR HEATER AND STEAM BOILER.

No. 413,758. Patented Oct. 29, 1889.

Witnesses
Walter P. Keene.
J. E. Middleton

Inventors.
Peter Littler,
Thomas Haslam,
John Moorcroft
By Ellis Spear
Atty (No Model.) 3 Sheets—Sheet 3.
P. LITTLER, T. HASLAM & J. MOORCROFT.
COMBINED AIR HEATER AND STEAM BOILER.
No. 413,758. Patented Oct. 29, 1889.
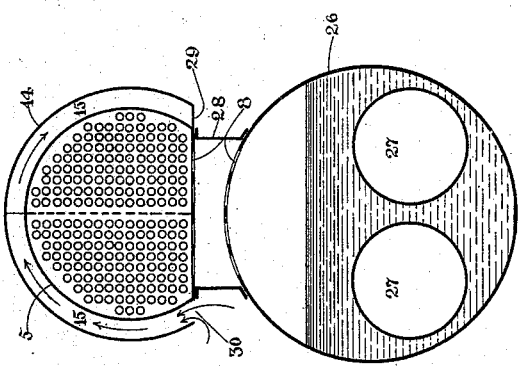
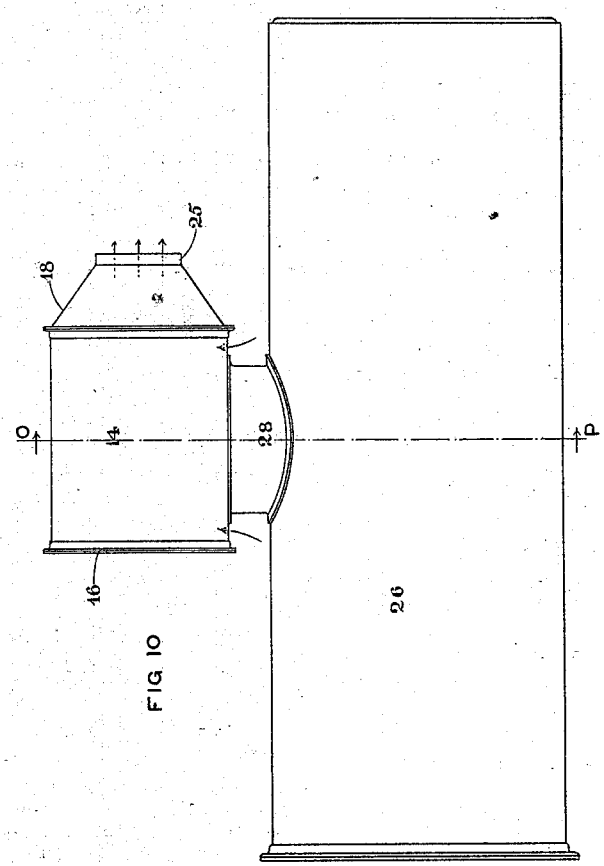
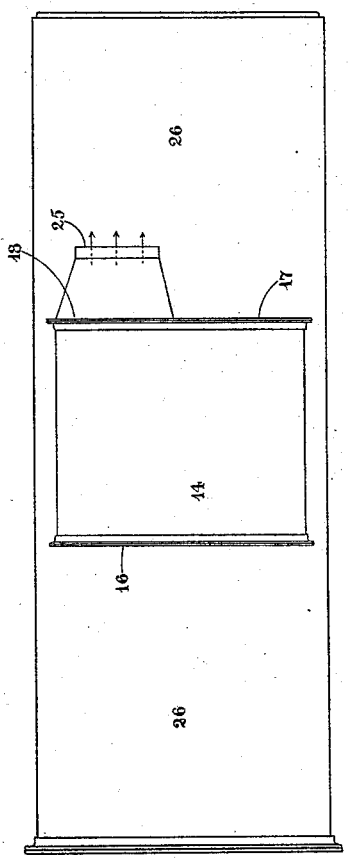

ered to pass

UNITED STATES PATENT OFFICE.

PETER LITTLER, THOMAS HASLAM, AND JOHN MOORCROFT, OF LIVERPOOL, COUNTY OF LANCASTER, ENGLAND.

COMBINED AIR-HEATER AND STEAM-BOILER.

SPECIFICATION forming part of Letters Patent No. 413,758, dated October 29, 1889.

Application filed March 12, 1889. Serial No. 302,943. (No model.)

*To all whom it may concern:*

Be it known that we, PETER LITTLER, THOMAS HASLAM, and JOHN MOORCROFT, all subjects of the Queen of Great Britain, and all residing at Liverpool, in the county of Lancaster, England, have invented a new Combined Air-Heater and Steam-Boiler, of which the following is a specification.

In our apparatus the air is raised to its final temperature by being caused to pass over surfaces heated by steam, and the fact that the air cannot therefore be raised to a higher temperature than the steam renders our apparatus especially applicable for heating air used for drying cotton and other materials and for other purposes where the risk of fire has to be guarded against.

The objects of our invention are, first, to combine in one structure an air-heater and a steam-boiler, whereby simplicity and economy of first cost are attained, and, second, to arrange the heating-surfaces of the air-heater so that a high degree of efficiency is obtained and so that the air is gradually heated before reaching those parts of the heating-surfaces which are tubular, thus avoiding the prejudicial effects of a current of cool air on the connections between the tubes and the tube-plates.

In order that our invention may be readily understood, reference is made to the accompanying drawings, which form part of this specification, in which—

Figures 1 to 8, on Sheets 1 and 2, illustrate one form of our combined apparatus, in which the air-heater is shown in combination with a vertical steam-boiler of the ordinary type suitable for generating steam at high pressure; and Figs. 9 to 11, Sheet 3, illustrate diagrammatically another form of our combined apparatus, in which the air-heater is shown in combination with a horizontal boiler of the ordinary type.

Figure 2:
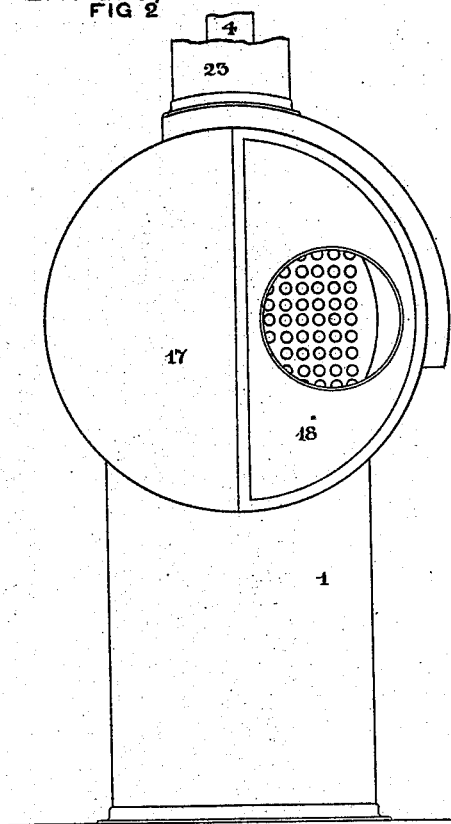
Figure 4:
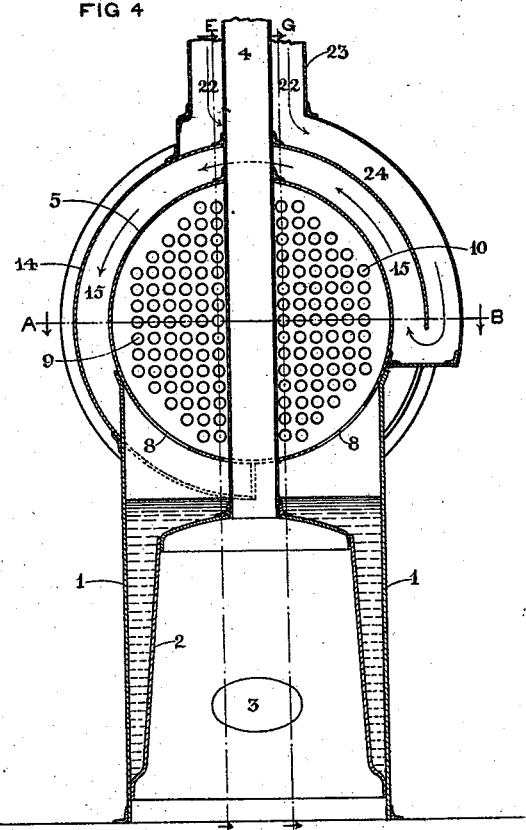
Figure 1:
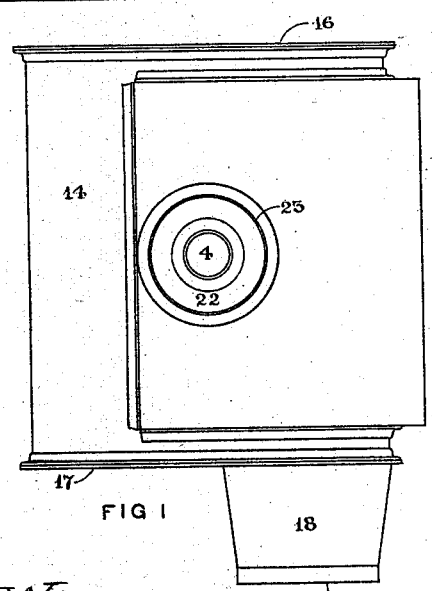
Figure 3:
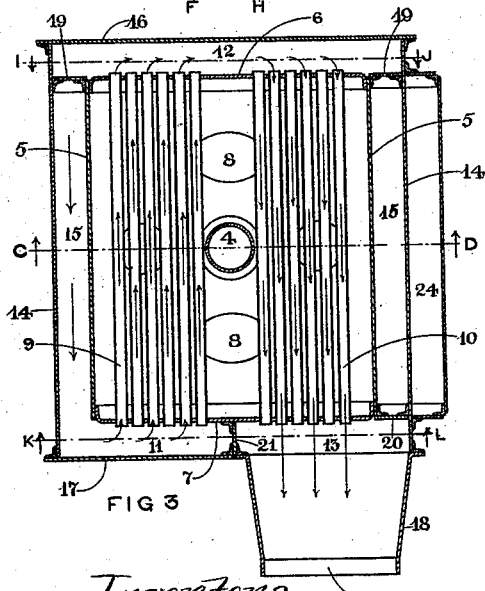
Figure 5:
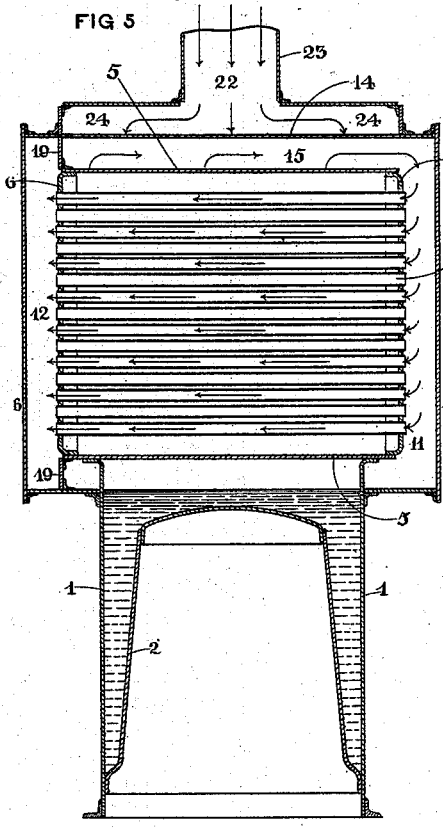
Figure 6:
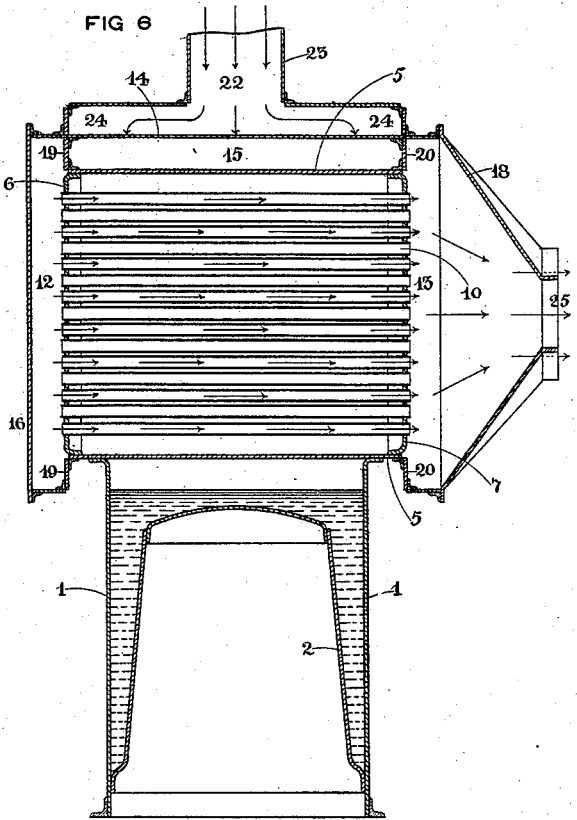
Figure 7:
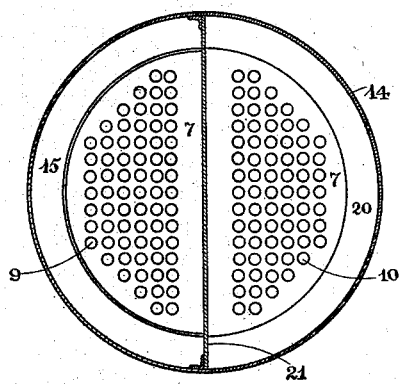
Figure 8:
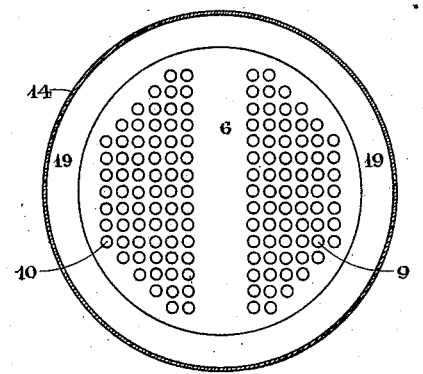

Referring to the first-mentioned form, Fig. 1 is a plan; Fig. 2, an elevation; Fig. 3, a sectional plan on A B of Fig. 4; Fig. 4, a sectional elevation on C D of Fig. 3. Fig. 5 is a sectional elevation on E F of Fig. 4; Fig. 6, a sectional elevation on G H of Fig. 4. Fig. 7 is a sectional elevation on K L of Fig. 3, and Fig. 8 a sectional elevation on I J of Fig. 3. Fig. 9 is a plan; Fig. 10, an elevation; and Fig. 11, a diagrammatic section on O P of Fig. 10. The sections in each case are viewed in the direction of the arrows placed adjacent to the letters indicating the plane of section. In Figs. 7 and 8 (with the exception of the tubes and tube-plates) and in Figs. 5 and 6 all parts behind the plane of section are, for simplicity, omitted, and throughout the drawings similar parts are indicated by the same reference-figures.

1 is the shell of the boiler.

2 is the fire-box.

3 is the fire-door, which is shown only in Fig. 4, being omitted in Figs. 5 and 6. The fire-bars and minor details are omitted.

4 is the chimney.

5 is the inner shell of the air-heater, which is cylindrical, the ends being formed by the tube-plates 6 and 7. The chamber so formed communicates with the interior of the shell 1 by means of the openings 8, so that the steam-space within the said chamber forms part of the steam-space of the boiler. Two stacks of tubes 9 and 10 pass steam-tight through the tube-plates. The ends of each stack open into the pocket 12, the stack 9 connecting the pocket 12 to the pocket 11, and the stack 10 connecting the pocket 12 to the pocket 13.

14 is the outer shell of the air-heater, which is cylindrical and concentric with the inner shell and forms an annular passage 15 between the said shells. The outer shell is carried beyond the inner shell to form the pockets, and the ends are closed by the covers or tube-doors 16, 17, and 18. The door 18 has an opening 25, to which the air-outlet pipe is attached. The passage 15 communicates with the pocket 11, but is separated from the pocket 12 by the annular division-plate 19, and from the pocket 13 by the annular division-plate 20. The pockets 11 and 13 are separated by a vertical division-plate 21, which is attached to the tube-plate 7. The air-inlet is the annular space 22 between the circular casing 23 and the chimney 4. The casing 23 is carried as high as may be thought desirable, and where necessary it is provided with a hood to prevent sparks passing into the air-heater. This annular space 22 opens into the passage 24, formed on the outside of the outer shell of the air-heater, and the passage 24 opens into the annular passage 15, as shown in Fig. 4.

The action of the apparatus is as follows: The boiler being filled to the proper level with water, and steam being raised till a sufficient temperature is attained, we either force or draw a current of the air to be heated through the air-heater. The air enters at 22 and passes through the passage 24 into the annular passage 15. It passes through this annular passage into the pocket 11, then through the stack of tubes 9 into the pocket 12, then through the stack of tubes 10 into the pocket 13, and leaves the air-heater by the outlet 25.

If necessary, the tubes may be divided into three or more stacks and the pockets subdivided, so as to cause the current of air to traverse the length of the air-heater more than twice, after the manner well understood in surface condensers and the like.

The steam-stop valve, for withdrawing steam from the boiler, which is placed as high as possible on the shell 5, has, together with other mountings and details common to all boilers, been omitted from the drawings. As many of the tubes 9 and 10 as may be thought necessary are fitted as stay-tubes to support the tube-plates.

Referring now to the second form of our combined apparatus, (shown diagrammatically in Figs. 9, 10, and 11 of Sheet 3, where the air-heater is combined with a horizontal boiler of ordinary type,) 26 is the boiler-shell, 27 the flues, and 28 a cylindrical neck or connecting-piece for uniting the air-heater and boiler. With the exception that the flue 4, the casing 23, and the passage 24 are now dispensed with, the air-heater may be exactly similar to that illustrated in Figs. 1 to 8, the connecting-piece 28 taking the place of the upper part of the shell 1. Figs. 9, 10, and 11 show, however, a slightly-modified construction, which may be adopted where steam of comparatively low pressure is used. Here the inner shell 5 and the outer shell 14 are cut by a plane 29, parallel to their common axis, which forms the bottom of the air-heater, and being a flat plate facilitates the attachment of the air-heater to the connecting-piece 28. The chamber of the air-heater communicates with the steam-space of the boiler by the holes 8 in the shell 26 and plate 29, and so forms a steam receiver or dome. The air to be heated enters directly at 30 into the annular passage 15, and, as before, after circulating through the two stacks of tubes, leaves by the outlet 25.

We are aware that prior to our invention air has been heated by being passed through or over tubular or other heating surfaces heated by steam, and we make no broad claim to apparatus in which air is so heated; but, What we do claim as our invention, and desire to secure by Letters Patent, is—

1. The combination, with a steam-boiler, of an air-heater having an outer inclosing-shell with a division therein at one end, an opening on each side of said division—one for the admission of air to be heated and the other for the exit of the heated air—an inner shell with a space between it and the outer shell at each end and around a portion of its periphery, and a series of pipes within the inner shell, substantially as described.

2. The combination, in one structure, of a steam-boiler with a tubular air-heater, the latter consisting of a chamber which forms part of the steam-space of the boiler, through which chamber pass a number of tubes divided into stacks, an annular passage which partially surrounds the said chamber, an air-inlet which surrounds the chimney of the boiler, a passage connecting the air-inlet to the annular passage, tube-doors, and division-plates to direct a current of air entering the air-inlet, so that it passes through the annular passage and then passes in succession through each stack of tubes, substantially as set forth.

3. In a tubular air-heater, the combination of a chamber through which pass a number of tubes divided into stacks, an annular passage which partially surrounds the said chamber, an air-inlet which surrounds a boiler or other chimney, a passage connecting the air-inlet to the annular passage, tube-doors, and division-plates to direct a current of air entering the air-inlet, so that it passes through the annular passage and then passes in succession through each stack of tubes, substantially as set forth.

4. The combined air-heater and steam-boiler, consisting, essentially, of the boiler 1; the inner shell 5, the outer shell 14, the annular passage 15, the tube-plates 6 and 7, the stacks of tubes 9 and 10, the tube-doors 16, 17, and 18, the air-inlet 22, surrounding the chimney 4, and the division-plates 19, 20, and 21, all substantially as herein described and illustrated.

In testimony whereof we have hereunto set our hands in the presence of two subscribing witnesses.

PETER LITTLER.
THOMAS HASLAM.
JOHN MOORCROFT.

Witnesses:
ROBERT A. SLOAN,
JOHN LLOYD BARNES,
   26 *Castle St., Liverpool.*